Aug. 13, 1974   J. M. FISHER   3,829,353
METHOD OF MAKING INFLATABLE ASSEMBLY WITH
BULKHEADS AND RESULTING ARTICLE
Filed March 21, 1973   2 Sheets-Sheet 2

United States Patent Office 3,829,353
Patented Aug. 13, 1974

3,829,353
METHOD OF MAKING INFLATABLE ASSEMBLY WITH BULKHEADS AND RESULTING ARTICLE
John M. Fisher, 622 Sackett Ave.,
Cuyahoga Falls, Ohio 44221
Filed Mar. 21, 1973, Ser. No. 343,442
Int. Cl. A62b 1/20; A47c 27/08; D03d 11/02
U.S. Cl. 161—92                                      9 Claims

ABSTRACT OF THE DISCLOSURE

An inflatable assembly made from structural members of two-ply woven fabric coated on the outside with sealing material and having spaced apart interwoven connections. One ply is cut close to the interwoven connections to provide narrow flaps and at a distance from the interwoven connections to provide wide flaps. The narrow flaps are adhered to the wide flaps to prevent pulling out of the cut portions of the plies at the interwoven connections. Two or more structural members are assembled into an inflatable assembly by adhering together the ends of the wide flaps of overlapping structural members to form bulkheads in the assembly.

BACKGROUND OF THE INVENTION

This invention relates to the construction and method of making inflatable assemblies having bulkheads such as escape slides for aircraft and offshore oil well platforms. Inflatable assemblies of this type must be deployed in a manner of seconds and are subject to high stresses due to the wind and weather conditions in which they must operate. Furthermore, the reliability of the construction is essential because lives may depend upon the operation of these escape slides.

It is important to obtain the high performance and quality construction with a minimum of cost and therefore the number of cutting and splicing operations must be kept to a minimum to reduce the labor costs. It is also desirable to utilize all of the material to reduce waste and added cost.

In an escape slide, another problem is the compacting of the slide into a small space for storage when not in use. This necessitates the removal of substantially all the inflating medium from the assembly since any gas trapped within the assembly will result in an increased size of the deflated slide. Accordingly, the inside surface of the assembly should desirably provide openings for bleeding the inflating medium from the collapsed slide.

The firm adherence of the spliced sheet fabric members of the assembly is also important for the strength and durability required of escape slides.

SUMMARY OF THE INVENTION

According to this invention, an inflatable assembly which is suitable for an escape slide is provided in which structural sheet members are made from two-ply fabric having a coating of sealing material on the outside and with the cords exposed on the inside. One ply is connected to the other ply at spaced interwoven connections and this ply is severed between the connections so as to produce a wide and narrow flap which can be folded together to form a bulkhead member for the structural sheet member. This bulkhead member may then be spliced to a bulkhead member of an overlapping sheet member to provide the inflatable assembly desired. Special constructions may also be obtained by using three or more overlapping structural sheet members. This method of making an inflatable assembly utilizes the layer of sealing material on one side of the woven plies to provide greater adherence between the narrow and wide flaps and between the bulkhead members of overlapping structural sheet members. Surface openings between the woven cords within the assembly facilitate bleeding the air from the assembly and complete deflation of the assembly for storage.

The accompanying drawings show a preferred form and one modification made in accordance with and embodying this invention and which are representative of how this invention may be practiced.

DETAILED DESCRIPTION

Figure 1:
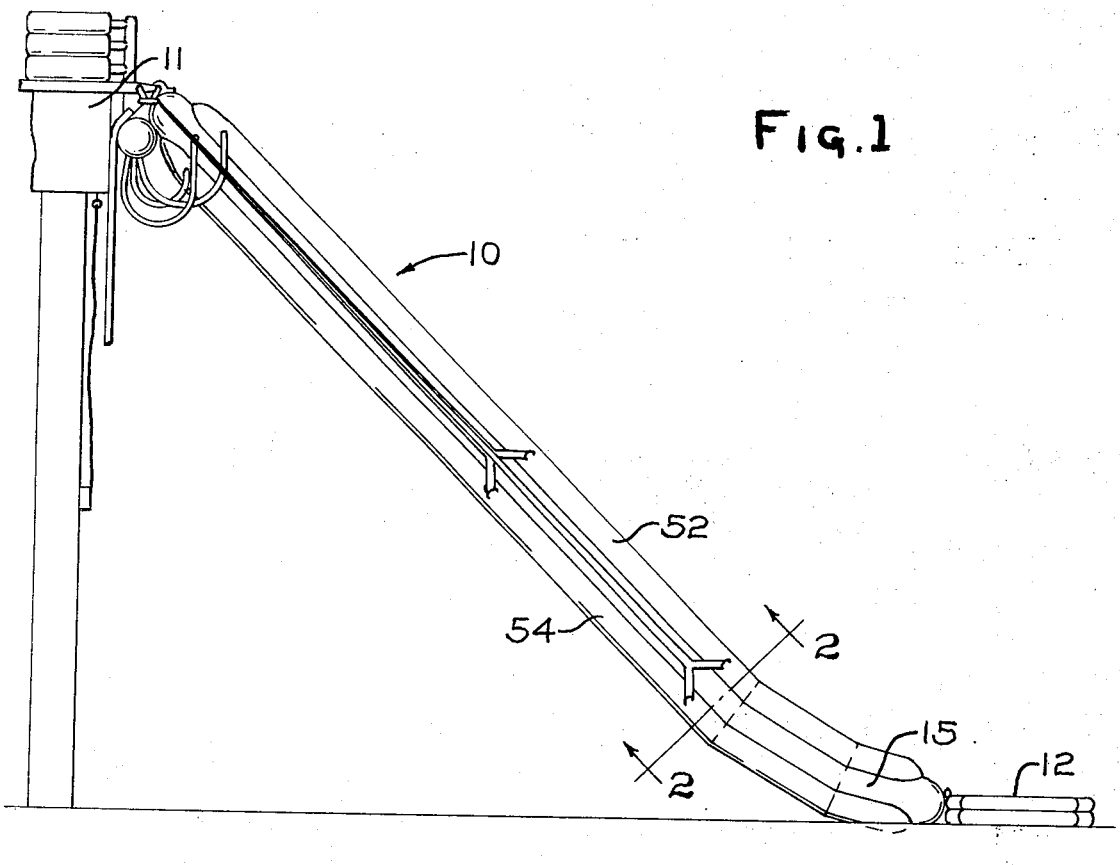
FIG. 1 is a side elevation of an inflatable escape slide for an offshore oil production platform made in accordance with and embodying the invention.

Referring to FIG. 1, a multitubular inflatable assembly such as an escape slide 10 is shown in the inflated condition in position for evacuating personnel from an oil production platform 11. At the lower end of the escape slide 10 an inflatable raft 12 is releasably connected to the slide for receiving the evacuees from the slide and carrying them to a place of safety.

Figure 2:
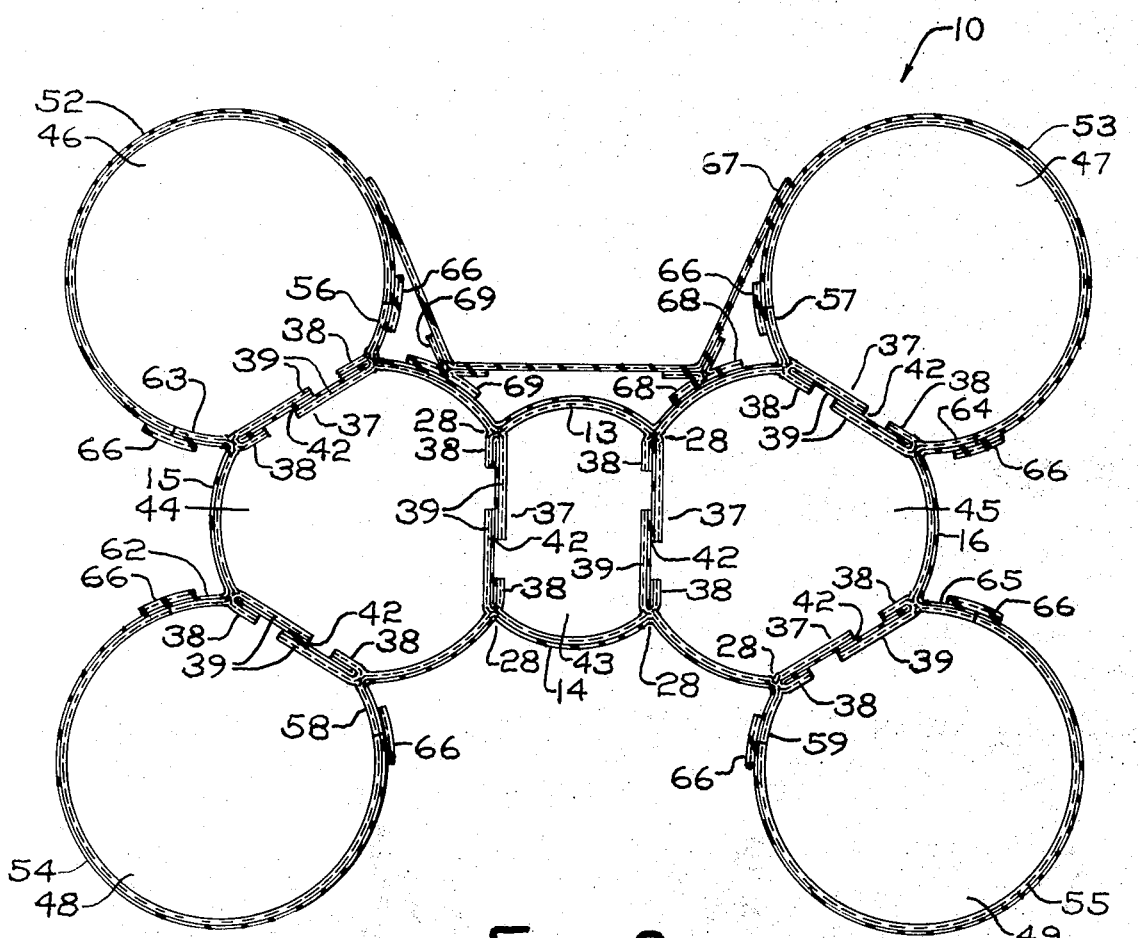
FIG. 2 is an enlarged sectional view of the slide in the inflated condition taken along the plane of line 2—2 of FIG. 1.

As shown more clearly in FIG. 2, the slide 10 is made from an upper structural sheet member 13 overlapping a lower structural sheet member 14 at the center of the slide with a left structural edge sheet member 15 overlapping the edges of the upper and lower sheet members at the left side. At the right side of the slide, as shown in FIG. 2, a right structural edge sheet member 16 overlaps the right edges of the upper and lower sheet members 13 and 14.

Figure 3:
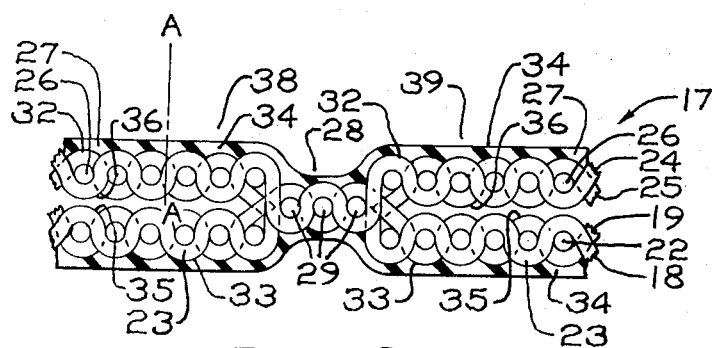
FIG. 3 is an enlarged fragmentary sectional view of the two-ply fabric showing an interwoven connection prior to the cutting of one ply.

Each of the structural sheet members 13, 14, 15 and 16 is made from two-ply fabric 17 of suitable material such as nylon cords. Warp cords 18 and 19 are woven around weft cords 22 in a primary ply 23 and warp cords 24 and 25 are woven around weft cords 26 of a secondary ply 27, as shown in FIG. 3. The primary ply 23 and secondary ply 27 are woven together at interwoven longitudinal connections 28 at spaced-apart positions extending transversely of the fabric 17. Connecting weft cords 29 are interwoven with both the warp cords 18 and 19 of the primary ply 23 and warp cords 24 and 25 of the secondary ply 27.

As shown in FIG. 3, outer surfaces 32 and 33 of the primary ply 23 and secondary ply 27, respectively, are coated with a layer of sealing material 34 which may be of rubber or other suitable gas impervious material having good adhering properties. Inner surfaces 35 and 36 of the primary ply 23 and secondary ply 27, respectively, are left bare to provide openings between interstices of the cords.

The interwoven connections 28 are spaced transversely of the structural sheet members 13, 14, 15 and 16 at locations where bulkhead members 37 are desired, as shown in FIG. 2. In order to provide the bulkhead members 37, the secondary ply 27 is cut in the longitudinal direction at a position shown by dot-dash line A—A in FIG. 3 close to the connection 28 to provide a narrow flap 38. This results in severing of the secondary ply 27 on the other side of the connection 28 at a substantial distance from the connection forming a wide flap 39.

Figure 4:
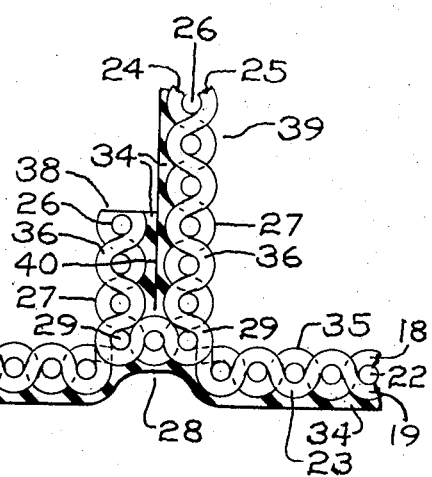
FIG. 4 is a view like FIG. 3 but showing the structural sheet member after cutting of the one ply and adhering the narrow flap to the wide flap to form the bulkhead member.

As shown in FIG. 4, the narrow flap 38 and the wide flap 39 are folded together and a suitable adhesive applied to the sealing layer 34 along the abutting surfaces 40 of the narrow flap and the wide flap causing them to be adhered together and resist pulling out of the warp cords 24 and 25 of the secondary ply 27 from around the connecting weft cords 29 at the interwoven connection 28 and thereby provide a high strength interwoven joint in the structural sheet members 13, 14, 15 and 16.

Referring again to FIG. 2, the bulkhead members 37 are formed by adhering the ends of the wide flaps 39 of overlapping sheet members 13, 14, 15 and 16 at splices 42 in which the surfaces of the wide flaps 39 coated with the layer of sealing material 34 are adhered together with a suitable adhesive.

The multitubular assembly of the slide 10, shown in FIG. 2, has a center chamber 43 formed by the upper sheet member 13 and lower sheet member 14 connected by wide flaps 39 extending from the interwoven connections 28 of these sheet members to form the bulkhead members 37. At each side of the central chamber 43 are edge chambers 44 and 45 at the left and right side, respectively. These chambers 44 and 45 are formed by the upper and lower sheet members 13 and 14 and the edge sheet members 15 and 16 at the left and right side, as shown in FIG. 2. The wide flaps 39 of the upper and lower sheet members 13 and 14 are adhered to the wide flaps 39 of the edge sheet members 15 and 16 to form the edge chambers 44 and 45. Extending above and below the edge chambers 44 and 45 are upper side chambers 46 and 47 and lower side chambers 48 and 49. The side chambers are formed by splicing side panel members 52, 53, 54 and 55 of coated nylon fabric to longitudinally extending edges 56 and 57 of the upper sheet member 13, edges 58 and 59 of the lower sheet member 14, edges 62 and 63 of the left sheet member 15 and edges 64 and 65 of the right edge sheet member 16. Overlapping splicing tapes 66 may be applied to the splices between the panel members 52, 53, 54 and 55 and the edges 56, 57, 58, 59, 62, 63, 64 and 65 of the sheet members.

A special fabric liner 67 for the slide 10 is adhered to the side panel members 52 and 53 and to the upper structural sheet member 13 by tape members 68 and 69 adhered to the liner and the upper sheet member.

In the manufacture of the slide 10, the two-ply fabric 17 is cut to form the narrow flaps 38 and wide flaps 39 which are then adhered together to form the structural sheet members 13, 14, 15 and 16. These structural sheet members may then be adhered together with only one critical joint at the splice 42 between the wide flaps 39 to form the bulkhead members 37. With this construction, a large number of configurations may be made within the scope of the invention.

Figure 5:
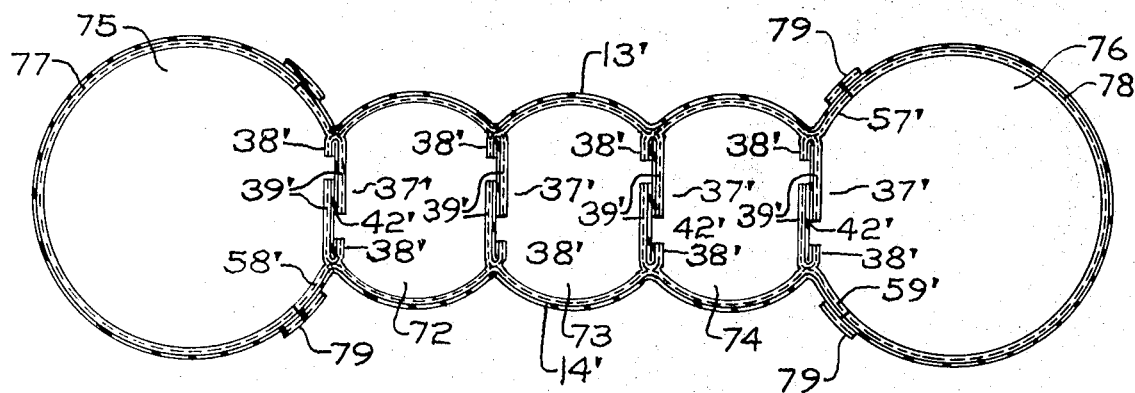
FIG. 5 is a sectional view of another form of inflatable assembly built in accordance with and embodying the invention.

Referring to FIG. 5, a modification of the invention is shown in which an upper structural sheet member 13' overlaps a lower structural sheet member 14' to form three central chambers 72, 73 and 74. With the wide flaps 39' joined at splices 42', edge chambers 75 and 76 are formed by splicing the longitudinally extending edges 56' and 57' of the upper sheet member 13' and 58' and 59' of the lower sheet member 14' to side panel members 77 and 78. Splicing tapes 79 are adhered to the edges 56', 57', 58', and 59' and to side panel members 77 and 78 in overlapping relation.

The inflatable assembly described hereinabove for escape slides may also be used for other tubular assemblies such as life rafts, protective mats and conduits where a reliable quality product is required and the cost of manufacture must be kept at a minimum.

I claim:

1. A structural member for an inflatable assembly comprising a primary ply of woven fabric, a secondary ply of woven fabric having interwoven longitudinal connections with said primary ply at spaced positions transversely of said member, said secondary ply being severed in the longitudinal direction between said connections at positions close to said interwoven connections at one side to form narrow flaps and at positions close to the adjacent connections on the other side of said connections to form wide flaps, and said narrow flaps and said wide flaps being folded and adhered together to prevent pulling out of the severed portions of said secondary ply from said primary ply at said interwoven connections, said primary ply and said secondary ply being coated with a layer of sealing material on the outside surfaces prior to severance of said secondary ply whereby the adhered surfaces of said narrow flaps and said wide flaps are coated with said sealing material to provide a strong bond therebetween, said wide flaps being adapted to form reinforced structural bulkheads of the inflatable assembly.

2. A structural member according to claim 1 wherein said primary ply and said secondary ply are woven of nylon cords.

3. A structural member according to claim 1 wherein said sealing material is rubber.

4. An inflatable assembly comprising two spaced-apart generally parallel structural sheet members connected by bulkhead members extending longitudinally of said member, each of said sheet members comprising a primary ply of woven fabric at the outside surface of said assembly, a secondary ply of woven fabric having interwoven longitudinal connections with said primary ply at spaced positions transversely of said primary ply, said secondary ply being severed in the longitudinal direction between said connections at positions close to said woven connections at one side to form narrow flaps and at positions close to the adjacent connection on the other side of said connections to form wide flaps and said narrow flaps being adhered to said wide flaps to prevent pulling out of the severed portions of said secondary ply from said primary ply at said interwoven connections and said bulkhead members being formed by adhering the wide flaps of one of said sheet members to the wide flaps of the other of said sheet members, said primary plies and said secondary plies of said sheet members being coated with a layer of sealing material on the outer surfaces prior to severance of said secondary plies with the adhered surfaces of said wide flaps of said connected sheet members and the adhered surfaces of said narrow flaps and said wide flaps of each of said sheet members being coated with said sealing material to provide a strong bond therebetween.

5. An inflatable assembly according to claim 4 wherein said primary ply of each of said sheet members has longitudinally extending edges at positions spaced from said interwoven connections at the sides of said assembly and side panel members are spliced to said edges of the primary plies to provide side chambers for said assembly.

6. An inflatable assembly according to claim 4 wherein structural edge sheet members having the same construction as each of said two structural sheet members are connected by edge bulkhead members to said two structural sheet members, said edge bulkhead members being formed by adhering the wide flaps of said two structural sheet members at the edge connections of said two structural sheet members to the wide flaps of said edge sheet members whereby side chambers are provided at the edges of said assembly.

7. An inflatable assembly according to claim 6 wherein said primary plies of each of said two structural sheet members and each of said edge sheet members have longitudinally extending edges at positions spaced from said interwoven connections at the sides of said assembly and side panel members are spliced to said edges of the primary plies of said edge sheet members and said two structural sheet members to provide upper and lower chambers at the sides of said assembly.

8. The method of making a structural member for an inflatable assembly comprising weaving a two-ply fabric having a primary ply and a secondary ply with longitudinal interwoven connections at space-apart positions transversely of said fabric, coating with a layer of sealing material on the outside of said two-ply fabric, severing said secondary ply in a longitudinal direction between said connections at positions close to said interwoven connections on one side to form narrow flaps and at positions close to the adjacent connections on the other side to form wide flaps and adhering the coated surfaces of said narrow flaps to the coated surfaces of said wide flaps to prevent pulling out of the severed portions of said secondary ply from said primary ply at said interwoven connections.

9. The method of making an inflatable assembly wherein structural sheet members are fastened together comprising forming said sheet members from two-ply fabric having a primary ply and a secondary ply woven together at spaced interwoven positions transversely of said fabric, coating the outer surface of said two-ply fabric with a layer of sealing material, severing said secondary ply close to said interwoven positions on one side to form narrow flaps and at a distance from said interwoven positions to form wide flaps, adhering the coated surfaces of said narrow flaps to the coated surfaces of said wide flaps, positioning said sheet members in overlapping relation with said wide flaps between said sheet members and adhering said wide flaps of one of said sheet members to said wide flaps of the other of said sheet members.

References Cited

UNITED STATES PATENTS

| | | | |
|---|---|---|---|
| 2,046,039 | 6/1936 | Schaar | 139—384 R |
| 2,949,264 | 8/1960 | Laureti | 139—384 R |
| 3,090,406 | 5/1963 | Koppelman et al. | 161—90 |
| 3,234,972 | 2/1966 | Koppelman et al. | 161—90 |
| 3,294,605 | 12/1966 | Fischer | 139—384 R |
| 3,473,641 | 10/1969 | Fisher | 193—25 B |
| 3,575,776 | 4/1971 | MacIntyre | 139—384 R |
| 3,598,159 | 8/1971 | MacIntyre | 139—384 R |

GEORGE F. LESMES, Primary Examiner

C. E. LIPSEY, Assistant Examiner

U.S. Cl. X.R.

5—348 R, 349; 9—2 A, 11 A; 139—384 R, 387 R, 388; 156—148, 270; 161—68, 88, 98, 122, 127, 139; 182—48; 193—25 B

UNITED STATES PATENT OFFICE
CERTIFICATE OF CORRECTION

Patent No. 3,829,353      Dated August 13, 1974

Inventor(s) J. M. FISHER

It is certified that error appears in the above-identified patent and that said Letters Patent are hereby corrected as shown below:

INSERT

Column 1, line 6 --- Assignee: The B.F. Goodrich Company, New York, N. Y. ---.

Signed and sealed this 31st day of December 1974.

(SEAL)
Attest:

McCOY M. GIBSON JR.
Attesting Officer

C. MARSHALL DANN
Commissioner of Patents